(12) United States Patent
Guthrie et al.

(10) Patent No.: US 6,691,303 B2
(45) Date of Patent: Feb. 10, 2004

(54) METHOD AND SYSTEM OF TESTING AND VERIFYING COMPUTER CODE IN A MULTI-THREADED ENVIRONMENT

(75) Inventors: Philippa Joy Guthrie, Bucks (GB); William Thomas Charnell, Bucks (GB); Stephen Darnell, Berks (GB); Blaise Abel Alec Dias, Middx (GB); Wayne Plummer, Bucks (GB); Jeremy Paul Kramskoy, Surrey (GB); Jeremy James Sexton, Herts (GB); Michael John Wynn, Berks (GB); Keith Rautenback, Bucks (GB); Stephen Paul Thomas, Bucks (GB)

(73) Assignee: Esmertec AG (CH)

( * ) Notice: Subject to any disclaimer, the term of this patent is extended or adjusted under 35 U.S.C. 154(b) by 47 days.

(21) Appl. No.: 09/859,162

(22) Filed: May 16, 2001

(65) Prior Publication Data

US 2002/0040470 A1 Apr. 4, 2002

Related U.S. Application Data

(63) Continuation of application No. PCT/GB99/00788, filed on Mar. 16, 1999, now abandoned.

(30) Foreign Application Priority Data

Nov. 16, 1998 (GB) ................................................ 9825102

(51) Int. Cl.[7] .............................. G06F 9/44; G06F 9/45; G06F 1/12
(52) U.S. Cl. ...................... 717/124; 717/148; 709/400
(58) Field of Search .............................. 717/124, 127, 717/136, 139, 140, 141, 148, 151; 709/310, 400

(56) References Cited

U.S. PATENT DOCUMENTS

| | | | |
|---|---|---|---|
| 4,675,829 | A | 6/1987 | Clemenson |
| 4,924,408 | A | 5/1990 | Highland |
| 5,210,876 | A | 5/1993 | Uchida |
| 5,301,260 | A | 4/1994 | Miyashita |
| 5,301,325 | A | 4/1994 | Benson |
| 5,339,436 | A | 8/1994 | Tairaku et al. |
| 5,367,685 | A | 11/1994 | Gosling |
| 5,442,792 | A | 8/1995 | Chun |
| 5,450,575 | A | 9/1995 | Sites |
| 5,452,457 | A | 9/1995 | Alpert et al. |
| 5,469,574 | A | 11/1995 | Chang et al. |
| 5,530,964 | A | 6/1996 | Alpert et al. |
| 5,551,040 | A | 8/1996 | Blewett |
| 5,590,332 | A | 12/1996 | Baker |

(List continued on next page.)

*Primary Examiner*—Anthony Nguyen-Ba
(74) *Attorney, Agent, or Firm*—Caesar, Rivise, Bernstein, Cohen & Pokotilow, Ltd.

(57) ABSTRACT

A method and system of testing and verifying computer code in a multi-threaded environment. The method includes testing a first piece of computer code that is an implementation of a specification against a second piece of computer code that is a different implementation of the specification. Corresponding synchronization points in the first and second pieces of code are defined and the first piece of code is executed to the first synchronization point of the first piece of code. A state message is generated and sent to the second piece of code. The second piece of code is executed to the first synchronization point of the second piece of code and then a state after message is generated and compared to the state before message. The synchronization points are generally selected from a group including conditional transfers of control, Method calls, Method returns, and backward transfers of control.

22 Claims, 2 Drawing Sheets

U.S. PATENT DOCUMENTS

| | | | |
|---|---|---|---|
| 5,598,561 A | | 1/1997 | Funaki |
| 5,603,030 A | | 2/1997 | Gray et al. |
| 5,613,120 A | | 3/1997 | Palay et al. |
| 5,655,122 A | | 8/1997 | Wu |
| 5,675,804 A | | 10/1997 | Sidik et al. |
| 5,721,854 A | | 2/1998 | Ebcioglu et al. |
| 5,761,513 A | | 6/1998 | Yellin et al. |
| 5,764,989 A | | 6/1998 | Gustafsson et al. |
| 5,815,720 A | | 9/1998 | Buzbee |
| 5,835,771 A | | 11/1998 | Veldhuizen |
| 5,848,274 A | | 12/1998 | Hamby et al. |
| 5,857,104 A | | 1/1999 | Natarjan et al. |
| 5,872,978 A | | 2/1999 | Hoskins |
| 5,873,104 A | | 2/1999 | Tremblay et al. |
| 5,946,487 A | * | 8/1999 | Dangelo ................ 717/148 |
| 5,948,059 A | * | 9/1999 | Woo et al. ............. 709/206 |
| 6,081,665 A | * | 6/2000 | Nilsen et al. .......... 717/116 |
| 6,126,329 A | * | 10/2000 | Bennett et al. ......... 717/127 |
| 6,308,316 B1 | * | 10/2001 | Hashimoto et al. ..... 717/127 |
| 6,317,872 B1 | * | 11/2001 | Gee et al. ............. 717/152 |
| 6,463,580 B1 | * | 10/2002 | Wilkerson ............. 717/149 |
| 6,463,582 B1 | * | 10/2002 | Lethin et al. .......... 717/158 |

* cited by examiner

METHOD AND SYSTEM OF TESTING AND VERIFYING COMPUTER CODE IN A MULTI-THREADED ENVIRONMENT

CROSS-REFERENCE TO RELATED APPLICATIONS

This is a continuation of International Application PCT/GB99/00788, filed on Mar. 16, 1999, which claims priority to U.K. Patent Application GB9825102.8, filed on Nov. 16, 1998, now abandoned, and all of whose entire disclosures are incorporated by reference herein.

BACKGROUND OF THE INVENTION

1. Field of Invention

This invention relates, in its most general aspects, to a computer system and to a method of operating that system, and to improvements in the performance of various operations within such a system. It also relates to a computer-readable storage medium. The computer system may be, may include, or may be part of, a virtual machine. The computer-readable storage medium may contain executable code or other instructions for programming the computer system/virtual machine. In particular, the invention relates to a method for automatic testing and verification of dynamically compiled code in a virtual machine.

2. Description of Related Art

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or subroutines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines running their own Apple System operating system, or various Unix machines running their own Unix operating systems. This proliferation of independent systems has led to useful applications being available only in one format and not being capable of running on a machine for which the application was not designed.

Under such circumstances, programmers have devised software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, colour display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc, but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages tend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as Java (registered trade mark to Sun Microsystems Corporation). Some of the following implementations will enable Java to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines. especially those using object-oriented languages, there are naturally areas where it is important and/or beneficial for some of the operations that are carried out within the system to be optimised. These may include reducing the memory requirement, increasing the speed of operation, and improving the 'transparency' of the system when embedded in another system. One of the principal aims of the inventions described herein is to provide a Virtual Machine which is optimised to work as quickly as possible within a memory constraint of, for example, less than 10, 5, 2 or even 1 Mbyte. Such a constraint is likely to be applicable, for example, to electronics gadgetry and other equipment where cost (or size) is a major constraint.

Errors in dynamically compiled code frequently manifest themselves a long time after the error actually occurred, making it difficult to identify the true cause. An error may appear benign when it occurs (for example an incorrect calculation which is not immediately used), but its effects may be disastrous at some future time or event (for example, when the incorrect value is used).

When changing and/or adding optimisations to a dynamic compiler, it is difficult to demonstrate that the code produced as a result is correct. The invention is therefore concerned with testing for such errors.

In one known technique, testing as such was not conducted in a forward-looking sense. Instead, when an error was noted, the process would be investigated backwards to locate the origin of the error. This technique was clearly open to the risk of potentially disastrous errors occurring unnoticed until too late.

In another known technique which is an improvement over the previous one just mentioned, two execution engines are used within the same process and their results are compared. One execution engine is the trusted implementation (the master) and the other is the implementation under test (the slave). This test process is limited to a singly-threaded application and can be both cumbersome and time-consuming, since the execution engines must be run in series. The process is to save the initial state (state 1), run part of the master, save the final state of the master (state 2), restore state 1, run part of the slave, then check the final state of the slave against the saved state 2 to detect discrepancies.

The testing technique implemented in Softwindows (by Insignia) was of such a type as just outlined. While effective for its purpose it would be fair to say that it was limited in that it was only applicable to single threaded environments and, when applied to a CPU emulator, had an executable that was simply enormous. The executables for the master and slave were in the same executable so testing had to be done in series. Moreover, the testing technique could itself introduce bugs and dissimilarities between master and slave. The points at which comparisons of state would have been carried out were largely only at transfers of control.

Techniques for identifying the cause of errors once identified tend to perturb the system under test, often to the extent of changing or removing (temporarily) the failure behaviour.

BRIEF SUMMARY OF THE INVENTION

The object of the invention is therefore to provide a quicker and more reliable system and method for testing pieces of executable code, preferably executable code produced by a dynamic compiler.

A first aspect of the present invention provides a method of testing a first piece of computer code which is an implementation of a particular specification against a second piece of computer code which is a different implementation of the same specification, including the steps of: defining corresponding synchronisation points in both pieces of code; executing both pieces of code; and comparing the states produced by both pieces of code at the synchronisation points.

In many cases, the First piece of code can be a tested implementation of the specification (a 'master'), whilst the second piece of code can be an implementation under test (a 'slave').

If a discrepancy is found in the states produced, then it will indicate that since the previous synchronisation point the behaviour caused by the two pieces of code has differed. The code which has been executed by the slave since the last synchronisation point can easily be identified.

If a discrepancy is found, it indicates that one (or possibly both) pieces of code contains an error. The error is generally found in the slave if only because it is likely to be newer, more complex, and less tested than the trusted master, but nevertheless this method may identify an error in the trusted master provided that the slave is either correct or at least differently incorrect.

Preferably, the first and second pieces of code are executed by first and second different executables, respectively, e.g., a machine or machines having separate address systems and separate stacks.

This aspect of the invention is particularly applicable when the first and second pieces of code are executed by first and second different virtual machines, respectively, thus increasing efficiency. The virtual machines need not necessary employ the same architectures and/or operating systems. The system may operate independent processes and may optionally be concurrent.

In the case where the first and second pieces of code each include native methods or functions, at least one such native method or function required by the second piece of code may be executed by the first executable (e.g., the master) and the result thereof being returned to the second executable. In this case, the method preferably further includes the step of providing from the first executable to the second executable a list of such native methods or functions which are to be executed by the first executable.

In the comparing step for each synchronisation point in the first piece of code, the first executable (preferably the master) checks the state of the second executable at the corresponding synchronisation point in the second piece of code. For each synchronisation point in the second piece of code, the second executable (preferably the slave) saves the values of at least any of its state elements which are not up-to-date, updates the values of those state elements, transfers the values of its state elements to the first executable, and then restores the saved values of the updated state elements.

For increased efficiency, the first and second pieces of code are preferably executed in parallel.

This aspect of the invention is particularly applicable to pieces of code which are dynamically compiled.

The synchronisation points are preferably selected from: conditional transfers of control; method/function/procedure calls or returns; and backward transfers of control.

In the case where the first and second pieces of code each have plural threads of execution, a correspondence is preferably identified between corresponding threads produced by the first and second pieces of code, and in this case such corresponding synchronisation points are preferably defined in such corresponding threads.

Preferably, the programming language is Java and synchronisation is effected on a per thread basis. More especially, in that case there are preferably a plurality of asynchronously handled thread pairs.

Also, a correspondence is preferably identified between corresponding objects dynamically allocated by the first and second pieces of code.

A second aspect of this invention provides a computer system programmed to perform the method of the first aspect of the invention.

A third aspect of this invention provides a computer system for testing a first piece of computer code which is an implementation of a particular specification against a second piece of computer code which is a different implementation of the same specification, wherein: corresponding synchronisation points are defined in both pieces of code; and the system includes: means for executing both pieces of code; and means for comparing the states produced by both pieces of code at the synchronisation points.

A fourth aspect of this invention provides a computer system for testing a first piece of computer code which is an implementation of a particular specification against a second piece of computer code which is a different implementation of the same specification, wherein: corresponding synchronisation points are defined in both pieces of code; and the system includes: a first executable for executing the first piece of code; and a second executable for executing the second piece of code; the first executable also being operable to compare the states produced by both pieces of code at the synchronisation points.

In the fourth aspect of this invention, the first and second executables are preferably provided by first and second different virtual machines, respectively.

The systems according to the third or fourth aspects of the invention are preferably programmed to perform the method of the first aspect of this invention.

A fifth aspect of this invention provides a computer storage medium, or computer storage media, having recorded thereon a first piece of computer code which is an implementation of a particular specification and a second piece of computer code which is a different implementation of the same specification, wherein corresponding synchronisation points are defined in both pieces of code.

A sixth aspect of this invention provides a computer storage medium, or computer storage media, having recorded thereon a program to cause a computer system to perform the method of the first aspect of the invention or to operate in accordance with any of the second to fourth aspects of this invention.

Particularly where the specification is of an execution engine for Java bytecode, the two implementations are advantageously built into different virtual machines (VMs). The VM containing the trusted implementation is called the Master VM, and the VM containing the implementation under test is called the Slave VM. Both VMs execute the same application and communicate with each other at known synchronisation points to exchange and compare the states of the virtual machines.

Advantageously in the above systems and methods, the synchronisation points may be chosen (at least) in (partial) dependence upon (and preferably in proportion to) the length of code. This gives the dynamic compiler the best chance of performing the same optimisations as when not tinder test and hence reduces perturbation.

In a specific embodiment of the invention, the slave VM undergoes minimal perturbation, reducing the possibility of changing the failure behaviour. Also, the state acted on by each implementation is independent of the state acted on by the other. Furthermore, the Slave VM requires few extra resources for this invention, increasing its applicability.

In the embodiment of the invention, the onus on the untested implementation in the slave VM is reduced. As will become apparent the onus on the untested implementation will be simply to transmit to the trusted implementation the final states at synchronisation points, also to be described later. Rather than having to play an active role, the untested implementation is effectively passive and passes to the trusted implementation only data as requested by the trusted implementation. Both implementations will start at the same initial states so the synchronisation points will be predictable. Moreover, the trusted implementation will normally be run on a powerful target machine, so that the Master VM can be heavily instrumented, whereas the test implementation could be run on a smaller, perhaps a hand-held, target machine. It is not normally necessary to port the Master VM to the target machine on which the Slave VM is to be run.

The invention also provides a method of testing one implementation of a particular specification against a different implementation of the same specification, including the steps of:

defining corresponding synchronisation points in both implementations; executing the one implementation and the similar implementation; and comparing the states produced by both pieces of code at the synchronisation points.

The invention also provides a computer system for testing one implementation of a particular specification against a different implementation of the same specification, including means for defining corresponding synchronisation points in both implementations, means for executing implementations, and means for comparing the states produced by both implementations at the synchronisation points.

Any, some, or all of the features of any aspect of the invention may be applied to any other aspect.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following Examples, but it should be understood that the present invention is not deemed to be limited thereto.

Figure 1:
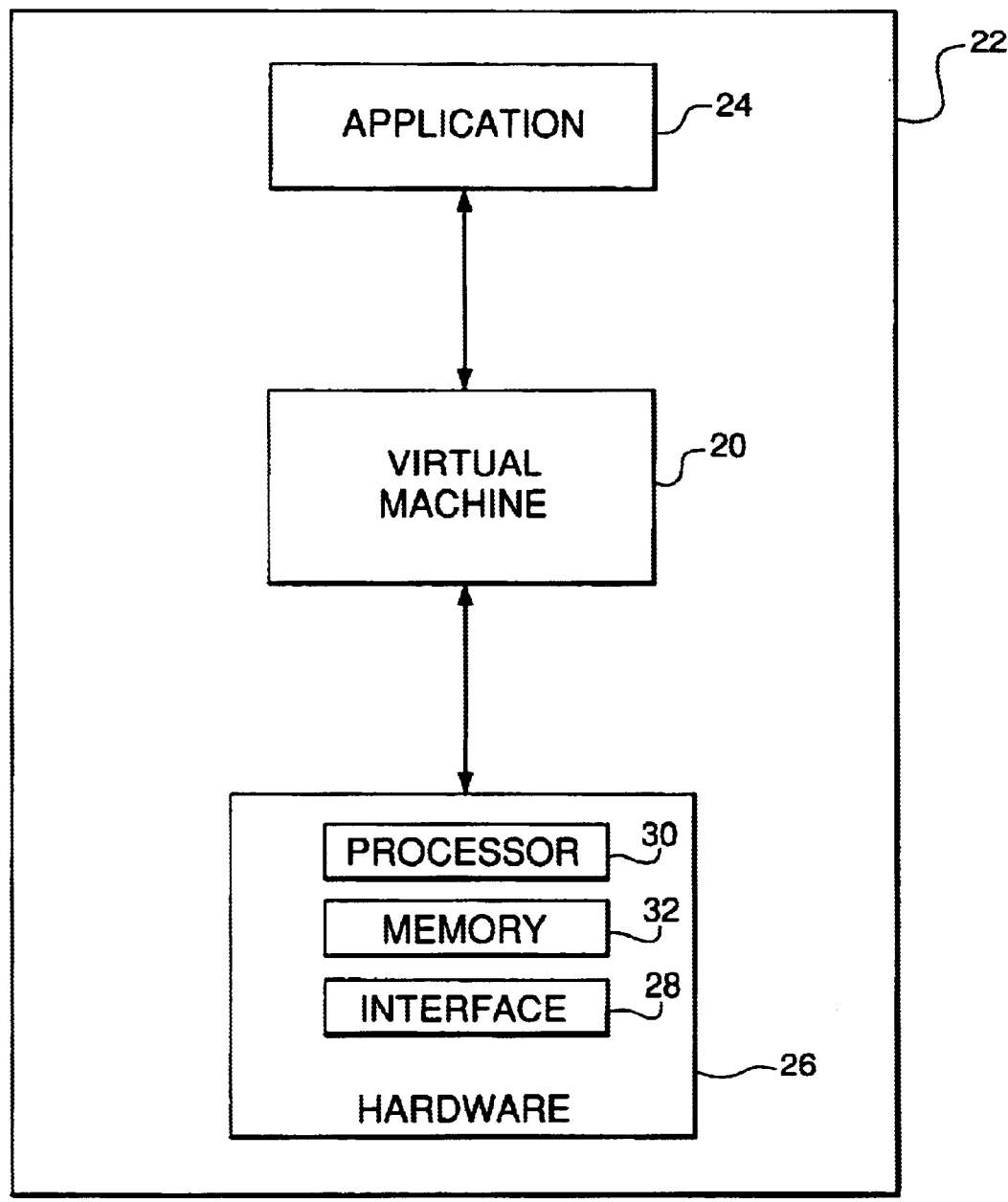
FIG. 1 is a block diagram of a virtual machine of the present invention.

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

Figure 1A:
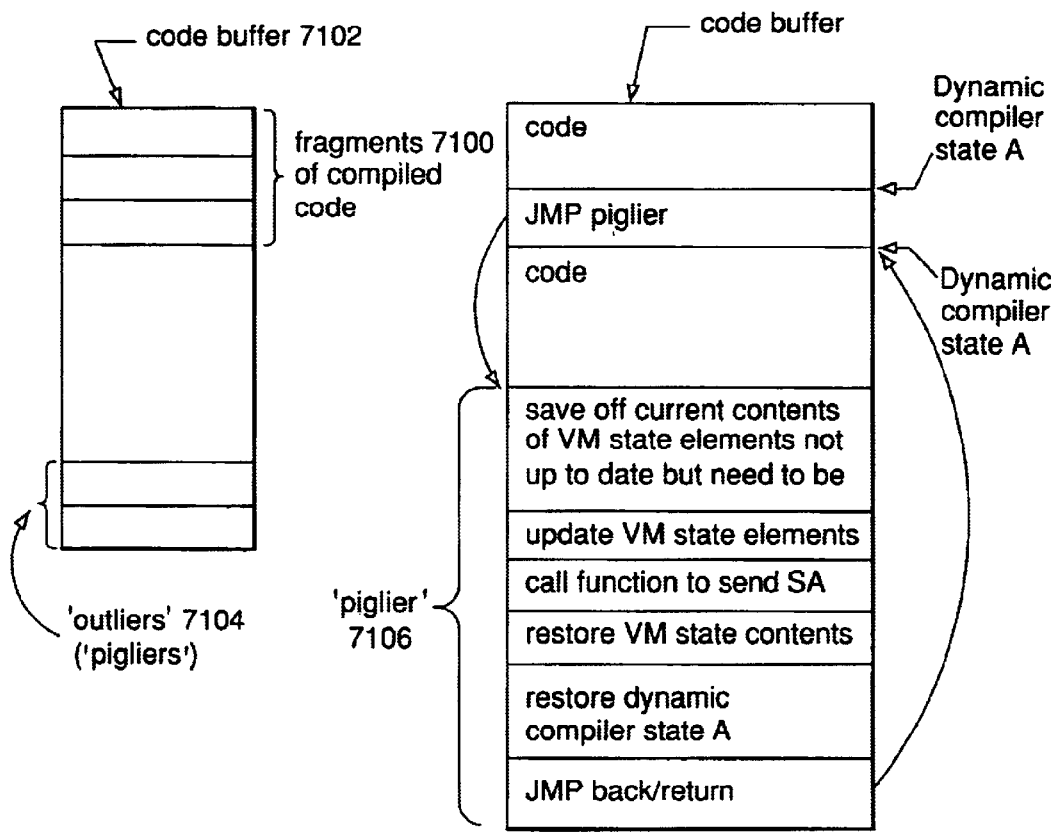
FIG. 1A shows schematically the code buffer configuration of an embodiment.
Figure 1B:
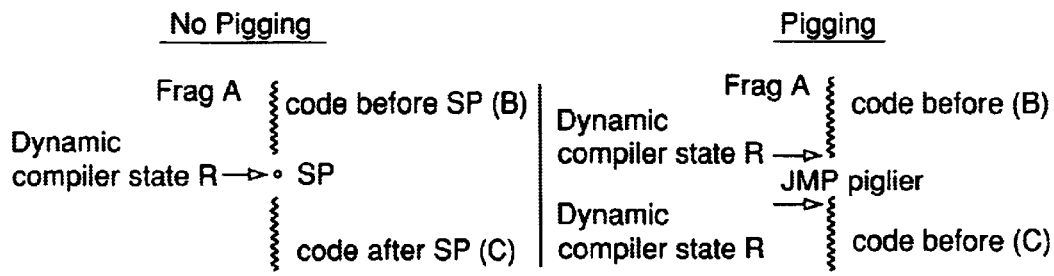
FIG. 1B shows schematically code fragments of an embodiment.

While this method of the present invention has been developed primarily for a Java virtual machine, the techniques used are more generally applicable. Reference will be made to FIGS. 1A and 1B which respectively illustrate schematically the code buffer configuration and code fragments in the implementation of the present testing technique.

Choice of Synchronisation Points

Both VMs must use the same synchronisation points. A suitable choice could contain all or some of the following: conditional transfers of control; method/function/procedure calls; method/function/procedure returns; and backward transfers of control.

The choice of synchronisation points is discussed further in the section "The Slave Virtual Machine" below.

If the virtual machine supports dynamically allocated objects, then the Master and Slave VMs must ensure that corresponding objects are identified on each VM.

If the virtual machine supports multiple threads, then the Master and Slave VMs must ensure that corresponding threads are identified on each VM and that each thread is independently synchronised.

If the virtual machine supports native methods or functions (i.e., those which are executed directly rather than via the virtual machine's execution engine), then most have to be executed solely on the Master and the return values and any necessary side-effects must be transmitted to the Slave. For example, a native function which returns the time of day would always be executed on the Master. This is because it would be a rare event indeed if clocks running on two different machines (VMs in the present context) were exactly in synchronism and it would be a pointless and expensive exercise to cater for such discrepancies in sophisticated testing techniques. On the other hand, a native function which causes the virtual machine to exit should be executed on both Master and Slave. Spurious synchronisation errors could arise without these elementary precautions being put in place. The Master would generally contain a list of those functions which only it can do and it would inform the Slave whether the Slave was permitted to run that function or, if not, what it needs to do otherwise.

In the case of a Java virtual machine, a native method may effect an invocation on a method written in Java. Regardless of whether the native method itself is being executed on both VMs or solely on the Master, such a Java method must be executed on both VMs.

The Master Virtual Machine

The Master (trusted) virtual machine is heavily instrumented to record all reads of the virtual machine state and all modifications of the virtual machine state.

Each execution thread synchronises independently with the corresponding execution thread on the Slave VM. The basic synchronisation loop is shown under the heading Per-thread synchronisation loop below.

Per-thread Synchronisation Loop

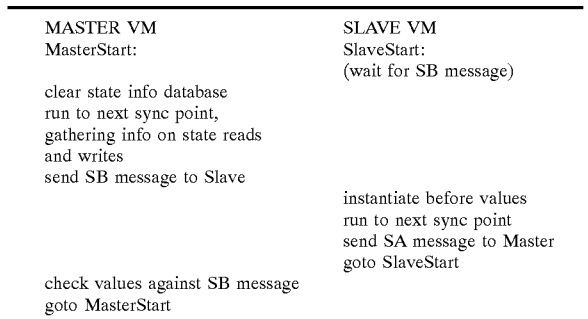

The Master starts its synchronisation loop by clearing its database of state information. It then runs to the next synchronisation point, adding to its state information database when any item of the virtual machine state is read or written. The item's type and value at any read, and before and after any write, are saved.

At the synchronisation point, the Master sends a State Before (SB) message to the slave and waits until it receives the corresponding State After (SA) message from the Slave once the Slave has reached the corresponding synchronisation point. When the Master receives the SA message from the Slave, it checks that all the virtual machine state items written by the Slave since the previous synchronisation point have the correct type and value. If any item is incorrect then the error can be communicated to the user immediately or batched for later examination. The Master can then proceed with the next iteration of the synchronisation loop.

An optimisation to the Master loop would be to have it continue with its next synchronisation loop immediately after sending the SB message rather than waiting for the SA message from the Slave. That wait can be postponed until the Master is ready to send its next SB message, in the expectation that the wait would be very much reduced, possibly to zero. A further optimisation would be for the Master to retain a buffer of several SB messages so that it could run several synchronisation loops before having to wait for the Slave. These optimisations may be worthwhile since the Master synchronisation loop is likely to be slower than the Slave. The Master execution engine is typically a much slower implementation than the Slave execution engine and in addition is burdened with the majority of the costs of this invention.

In many embodiments, the Master will use an interpreter for the execution of the code. A dynamic compiler can then be tested on the Slave VM. Alternatively, both Master and Slave can run compiled versions of the code, or may both interpret code, for example, to test a new interpreter on the Slave VM.

The Slave Virtual Machine

The Slave virtual machine (the VM Linder test) must keep its virtual machine state either up to date or easily updateable at synchronisation points, so that the types and values of state items written since the previous synchronisation point can be collected and sent to the Master. It is very important that this requirement is implemented in such a way as to minimise any perturbation to the Slave's usual mode of operation. When the Slave contains an optimising dynamic compiler it is particularly important not to generate different code when testing compared to that produced in normal operation.

This can be achieved by a combination of synchronisation points carefully chosen to coincide with times when the compiled code is likely to have the necessary state available if not in the correct place, and having the dynamic compiler generate a special piece of code at synchronisation points to save the contents of any state items not yet up-to-date, update them, create and send the SA message, and finally restore the saved contents of those state items especially updated for the synchronisation point.

The preferred choices for synchronisation points have already been mentioned. However, it should further be mentioned that not every transfer of control need necessarily be chosen as a synchronisation point. It is also possible to use every point of bytecode, but the risk of perturbation will be increased. The important feature in choosing synchronisation points is that they must be points where the current states can either be identified easily, for example, where all elements are in their home state, or can readily be put there. It is not normally possible to choose points within a section of an execution since the order of elements within a section may be altered as a consequence of that execution and there will not be a common point of reference for the slave and master implementations. Equally, synchronisation points should not be chosen too far apart since the chunk of code between them could possibly be too large for efficient investigation should an error have occurred in that chunk.

For these reasons, it is preferable that, at synchronisation points, the execution goes out to a separate piece of code, termed a 'piglier,' whose function is to update any necessary states. Once synchronisation and the necessary transfer of data is complete, the piglier undoes the updating and returns to the compiled version. At this state it is important that bugs are not imported into or removed from the compiled version.

A typical code buffer configuration is shown in FIG. 1A in which the left side of the drawing shows a generalised schematic whilst the right side illustrates the code buffer contents involved around a synchronisation point.

Fragments 7100 are generated at one end of a code buffer 7102 and outliers ('pigliers') 7104 at the other end.

At code generation time, the compiler lays down fragments of compiled code as normal until it detects a synchronisation point. The compiler saves its state at that point (i.e., 'Dynamic compiler state A' in FIG. 1A) then lays down the piglier 7106 itself and the jump to it (i.e., 'JMP piglier'). The code laid down for the piglier 7106 consists of code to save off the current contents of any VM state elements that are not up-to-date but need to be for this sync point; code to update those state elements; a call to the function to send the SA message; code to restore the previous contents of the VM state elements; and any code necessary to restore the saved compiler state ('Dynamic compiler State A'). For example, if the fragments of compiled code before the sync point had a particular value in a given register and the piglier code had changed the value in the register, then some code would be laid down to restore the original value of that register. The final code laid down in the piglier 7106 is a jump back to the fragment of compiled code following the 'JMP piglier' instruction.

The same process, but this time expressed in terms of fragments, is illustrated in FIG. 1B in the situation where there is no pigging and where there is pigging. As can be seen from this schematic representation, the code sections on either side of the synchronisation point (SP) are designated B and C. In the 'no pigging' case, the state of the dynamic compiler at SP during code generation time is termed 'Dynamic compiler state R'. In the 'pigging' case, the dynamic compiler must generate code such that the code sections B and C are identical to the code sections B and C respectively generated in the 'no pigging' case, and hence the state of the dynamic compiler both before and after generating the piglier code in the 'pigging' case is identical to 'Dynamic compiler state R' at the sync point SP in the 'no pigging' case. This ensures that when the generated code is executed, the execution of the piglier is essentially transparent and has no side-effects in the generated fragment code.

While it is possible for the piglier to be implemented in line, it is not the preferred option since it is unhelpful when trying to debug, and it makes it more difficult to identify and check the section of code between synchronisation points where the error occurred.

It is generally the case that the more processing that is done in the piglier, the more difficult it is to restore states. Also, the more frequent the synchronisation points, the more difficult it is to run the same code without turning off optimisations where there is the breater likelihood of errors occurring.

The preferred choices for synchronisation points are the conditional transfers of control, both back and forward, and optionally also at invoke points. It is not the preference for function/method returns.

Multi-threading Issues

If the virtual machine is multi-threaded, then the Master and Slave VMs will synchronise each execution thread separately. They must have a method of identifying corresponding execution threads on both VMs and exchanging messages at critical points such as thread and monitor state changes and creation.

With regards to synchronisation, there is a given starting thread, so the start conditions on the master and slave will be known. The behaviour of a thread in creating another thread is predictable as is the order of thread creation/shut down. It is therefore possible for the exchange of messages between master and slave to take place at thread start up points.

When the master thread A creates a thread B, that information is communicated to the slave so that the next thread which the corresponding thread A in the slave creates will (or should) also be B. The master (and slave) create a table containing the master thread identity (e.g., 'thread B i.d. is 5') and the slave thread identity (e.g., 'my thread B i.d. is 5') which can then be used to exchange messages. The same principle may be used for created objects. The SA and SB messages sent between master and slave must contain the id of the sending thread.

The Communication Mechanism

The communication required for this method can be implemented on top of any suitable transport mechanism, e.g., sockets or named pipes.

It is preferable that the VM used for the trusted implementation is a specially built VM to support pigging. Although that VM may be used otherwise than for pigging, it will generally be slow. It is preferable that the VM used for the implementation under test is a specially built VM to support pigging and pigliers.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like, are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in computer system itself; it may be embodied in a computer system when programmed with or adapted or arranged to execute the method of operating that system; and/or it may be embodiment in a computer-readable storage medium having a program recorded thereon which is adapted to operate according to the method of operating the system.

As used herein throughout the term 'computer system' may be interchanged for 'computer,' 'system,' 'equipment,' 'machine,' and like terms. The computer system may be, or may include, a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

What is claimed is:

1. A method of testing a first piece of computer code that is an implementation of a specification against a second piece of computer code that is a different implementation of the specification, the method comprising:

defining corresponding synchronization points in the first and second pieces of code, including respective first synchronization points in the first and second pieces of code;

executing the first piece of code to the first synchronization point of the first piece of code;

generating a state before message;

sending the state before message to the second piece of code;

executing the second piece of code to the first synchronization point of the second piece of code;

generating a state after message;

sending the state after message to the first piece of code; and comparing the state before message to the state after message.

2. A method as claimed in claim 1, wherein executing the first piece of code includes executing the first piece of code with a first executable and wherein executing the second piece of code includes executing the second piece of code with a second executable.

3. A method as claimed in claim 1, further comprising executing a native Method located in the first piece of code and sending the result of the native Method to the second piece of code.

4. A method as claimed in claim 1, further comprising generating a list of native Methods that are to be executed by the first piece of code; and providing the list of native Methods to the second piece of code.

5. A method as claimed in claim 1, further comprising saving values of state elements in the second piece of code;

updating the values of the state elements in the second piece of code; and sending the values to the first piece of code.

6. A method as claimed in claim 5, further comprising restoring saved values of state elements.

7. A method as claimed in claim 1, further comprising clearing a state information database.

8. A method as claimed in claim 7, further comprising adding to the state information database when reading or writing to an item.

9. A method as claimed in claim 1, wherein defining corresponding synchronization points includes selecting synchronization points from a group of conditional transfers of control, Method calls, Method returns, and backward transfers of control.

10. A method as claimed in claim 1, wherein execution of the second piece of code is transferred at a synchronization point of the second piece of code to a piglier.

11. A method as claimed in claim 1, wherein generating a state before message includes incorporating the identity of a sending thread.

12. A method as claimed in claim 1, wherein generating a state after message includes incorporating the identity of a sending thread.

13. A method of testing a first piece of computer code that is an implementation of a specification against a second piece of computer code that is a different implementation of the specification, the method comprising:

implementing a per-thread synchronization loop.

14. A method as claimed in claim 13, further comprising:

generating a state before message;

implementing a second per-thread synchronization loop; and generating a state after message.

15. A method as claimed in claim 14, further comprising storing state after messages in a buffer.

16. A system for testing a first piece of computer code that is an implementation of a specification against a second piece of computer code that is a different implementation of the specification, the system comprising:

a first virtual machine for executing the first piece of code, the first virtual machine configured to execute the first piece of code to a first synchronization point in the first piece of code and generate a first state message;

a second virtual machine for executing the second piece of code, the second virtual machine configured to execute the second piece of code to a first synchronization point in the second piece of code, and having a compiler operable to generate a piglier and a second state message; and a transport mechanism coupled to the first and second virtual machines to transfer the first and second state messages between the first and second virtual machines.

17. A system as claimed in claim 16, wherein each of the first synchronization points in the first and second pieces of code are selected from a group of conditional transfers of control, Method calls, Method returns, and backward transfers of control.

18. A system as claimed in claim 16, wherein the first state message includes the identity of a sending thread.

19. A system as claimed in claim 16, wherein the second state message includes the identity of a sending thread.

20. A system as claimed in claim 16, wherein the piglier includes a component to save state elements of the second virtual machine.

21. A system as claimed in claim 16, wherein the piglier includes a component to update state elements of the second virtual machine.

22. A system as claimed in claim 16, wherein the piglier includes a component to restore state elements of the second virtual machine.

* * * * *